US009723515B2

(12) United States Patent
Lamy-Bergot et al.

(10) Patent No.: US 9,723,515 B2
(45) Date of Patent: Aug. 1, 2017

(54) SYSTEM AND METHOD FOR TRANSMITTING A PLURALITY OF MULTI-SERVICE STREAMS OVER AN HF BAND

(71) Applicant: THALES, Neuilly-sur-Seine (FR)

(72) Inventors: Catherine Lamy-Bergot, Gennevilliers (FR); Jean-Yves Bernier, Tubize (BE)

(73) Assignee: Thales, Neuilly sur Seine (FR)

( * ) Notice: Subject to any disclaimer, the term of this patent is extended or adjusted under 35 U.S.C. 154(b) by 221 days.

(21) Appl. No.: 14/397,397

(22) PCT Filed: Apr. 24, 2013

(86) PCT No.: PCT/EP2013/058529
§ 371 (c)(1),
(2) Date: Oct. 27, 2014

(87) PCT Pub. No.: WO2013/160366
PCT Pub. Date: Oct. 31, 2013

(65) Prior Publication Data
US 2015/0124721 A1 May 7, 2015

(30) Foreign Application Priority Data
Apr. 27, 2012 (FR) .................. 12 01242

(51) Int. Cl.
H04W 28/06 (2009.01)
H04L 5/16 (2006.01)
H04L 1/00 (2006.01)

(52) U.S. Cl.
CPC ......... H04W 28/065 (2013.01); H04L 1/0071 (2013.01); H04L 1/0083 (2013.01); H04L 5/16 (2013.01); H04L 1/0041 (2013.01)

(58) Field of Classification Search
None
See application file for complete search history.

(56) References Cited

U.S. PATENT DOCUMENTS

2003/0202460 A1* 10/2003 Jung .................... H04L 27/2621
370/208
2005/0246609 A1* 11/2005 Moulsley .................. H04L 1/08
714/752

(Continued)

FOREIGN PATENT DOCUMENTS

WO 2006011699 A1 2/2006

Primary Examiner — Christopher Crutchfield
Assistant Examiner — Tito Pham
(74) Attorney, Agent, or Firm — Baker Hostetler LLP

(57) ABSTRACT

A method and system is provided for transmitting data in a communication system operating in the HF band comprising a link layer and a physical layer. The system comprises a transmitter and a receiver. The transmitter comprises at least one scheduler. The method comprises a step of segmenting at least two data streams $F_1, F_2$ each of the streams having a service constraint, each being segmented into a plurality of data sub-blocks $F_jBi$, a step in which the data sub-blocks are transformed into a frame then a step of coding and interleaving the first frame $TF_1$, and of the second frame $TF_2$, producing sub-frames $STF_{1c}$, $STF_{2c}$, then generating a frame to be transmitted by mixing n sub-frames $STF_{1c}$ of the data stream $F_1$ with m sub-frames $STF_{2c}$ of the data stream $F_2$.

10 Claims, 7 Drawing Sheets

(56) References Cited

U.S. PATENT DOCUMENTS

| | | | |
|---|---|---|---|
| 2011/0019556 A1* | 1/2011 | Hsin | H04W 28/24 370/252 |
| 2013/0170528 A1* | 7/2013 | Pantelias | H04L 12/2801 375/222 |
| 2013/0260812 A1* | 10/2013 | Li | H04W 12/06 455/509 |

* cited by examiner

SYSTEM AND METHOD FOR
TRANSMITTING A PLURALITY OF
MULTI-SERVICE STREAMS OVER AN HF
BAND

CROSS-REFERENCE TO RELATED APPLICATIONS

This application is a National Stage of International patent application PCT/EP2013/058529, filed on Apr. 24, 2013, which claims priority to foreign French patent application No. FR 1201242, filed on Apr. 27, 2012, the disclosures of which are incorporated by reference in their entirety.

FIELD OF THE INVENTION

The invention relates to a system and a method for conveying a plurality of streams requiring different service qualities, notably in terms of latency/jitter and residual error rate requirements.

It relates more particularly to the field of high frequency or HF communications and medium or high bit rate transmissions, typically with bit rate values greater than 4 kb/s, even very high bit rates typically with bit rate values greater than 32 kb/s.

The invention applies to links of point-to-point type and, more generally, to a multipoint usage in the context of the use of the TDMA (Time Division Multiple Access) protocol for a link between a plurality of users.

BACKGROUND

The long-haul communication capacity of HF links relies on the reflection of the HF waves varying within the range [2, 30 MHz], on the ionospheric layers. The ionospheric layers are not stable in time and space, which leads to strong variations of the propagation channel. To this channel instability are also added any scrambling factors, intentional or not, in particular at night when the passing HF spectrum is less great.

Although it is unstable, this channel does however offer the benefit of allowing long-haul communications without the need to previously deploy a complicated or costly infrastructure, unlike satellite communications for example. Although it offers these advantageous properties, the HF channel is currently used only for fairly simple services (telegraphy, speech, low-bit rate file transfers) because of the low bit rates offered. Efforts are therefore currently being made to increase the bit rates offered by the HF links, to obtain bit rates that are sufficient to allow the transmission of different data types (speech, file transfer, messaging, videotelephony, imaging on demand, for example).

One problem that arises, in the context of a multiservice use for HF band transmission, is linked to the half duplex operation, the latter generally being coupled with fairly lengthy interleaving times to fight against the very significant instantaneous fading effects to which the HF propagation channel is subject.

One known solution is to choose an interleaver of small size and a fast half-duplex switchover, corresponding to raw performance levels that are less good but with a greater responsiveness that is necessary for applications with strong real-time constraint such as speech.

Another solution consists in using an interleaver of large size and a slower half-duplex switchover, for example of 9 seconds frame duration in very long interleaving in the stanag 4539 standard that is known to those skilled in the art, when very good performance levels in terms of error rate are expected, and the latency or jitter constraints are low, as is the case for data transmission, for example.

In the case of a multiservice approach, it is known practice from the prior art to process the services sequentially, and thus to best adapt the communication conditions to each of them. This approach does not make it possible to multiplex the services. The real-time constraints of a given service will not therefore be able to be served without stopping the current service if it is activated when a communication for another service is already established. This, furthermore, prevents particular uses, such as, for example, switching over to a speech channel that might be set to standby in parallel with a data transmission without interrupting the latter. This also dictates a significant delay before the transmission of the acknowledgements or signaling information between the stations handling the communication. In the case involving serving the streams sequentially, it is not possible to conduct a plurality of communications in parallel on one and the same link and therefore it is necessary to await the end of the communication for the next service to be established.

It is also known practice to process the services jointly, by taking into account the strongest constraints in each of the areas (latency, jitter, error rate) if possible or, failing this, the strongest constraints concerning the real-time behavior (latency, jitter) and use the ARQ retransmission to successfully pass on the most sensitive service or services. The strong constraint imposed on the duration of the half-duplex switchover will greatly degrade the performance levels in terms of error rate, rendering the multiplexing ineffective.

By way of example, it may be necessary to divide the served bit rate by two or more by changing from a data transmission type mode with very long interleaver with the standard MIL STD 188-110B (target TEB=$10^{-5}$) to a speech-type mode with short interleaver with the standard MIL STD 188-110A (target TEB=$10^{-3}$).

FIG. 1 reviews the data processing principles implemented in a radio communication system. The data $D_1$ arrive at the receiver 1 in a queue 10 to be processed by a scheduler 11, possibly with the retransmissions 10' coming from the retransmission mechanism (ARQ) securing the link. The scheduler processes these data and prepares the frame 12 for sending to the physical layer comprising the correcting coding 13, interleaving and modulation 14. The duly modulated frame is then transmitted over the HF channel before being received by the receiver 2 comprising demodulation and de-interleaving 15 and correcting decoding 16 before reaching the counterpart of the scheduler 17 which reconstructs the packets, to obtain the data $D_2$.

FIG. 2 schematically represents the sequencing of the stream processing steps using a prior art method. FIG. 2 schematically shows the link layer and the physical layer.

At the link layer level, the data stream 20 to be transmitted is first of all segmented 21 into a plurality of blocks Bi (unitary cell for the process of securing the ARQ link, which is an information retransmission mechanism, or "Automatic Repeat reQuest"). Then, the method prepares the frame 22 by adding, for example, headers, by setting the frame to the format required for the transmission, then adds 23 an error correcting coding. The data of the frame will then be interleaved 24 according to a method known to those skilled in the art. The method will then transmit the frame 25 according to a sequence of transmission of one or more frames (251, 252, etc.) followed by a TX/RX (transmit/receive) half-duplex switchover, 253, then a sequence of reception of one or more frames (254, etc.). In this exemplary embodiment, the data are interleaved after the ARQ step, the frame formatting step and the step of introduction of a correcting coding. The bit rate is adapted through the choice of modulation and coding. The interleaving is adapted through the duration of the interleaver to the needs of the service concerned. Typically, speech will accept a target error rate of the abovementioned $10^{-3}$ class, but will require the use of a short interleaver (less 1 s) whereas a data transfer targets an error rate below $10^{-5}$ but accepts the use of long interleavers (typically greater than 9 s).

One of the objectives of the present patent application is to offer a system and a method that make it possible to effectively multiplex different services having different service qualities on one and the same communication link, and do so without degrading the transmission performance levels in terms of overall useful bit rate transmitted.

The following definitions will be used hereinbelow in the description.

A stream is a set of data originating from application layers and which are brought to the transmission system to be sent to one or more receivers. The data of this stream, arriving for example in packet form (as in the case of applications over IP), are stored for processing in queues. The different mechanisms of the transmission system come to take the data from the queues according to their capacity to prepare the frames which will be transmitted. In practice, there are different levels of queues between the different processing instances of the radio system, even though, for simplicity, queues are more often mentioned with reference to those that exist at the level of the ARQ process, which introduces specific queues for the retransmissions. The frames are made up of a set of data with header, which are addressed from a sender to one or more remote receivers. A frame conveys a portion of the information of a data stream.

SUMMARY OF THE INVENTION

The subject of the invention relates to a method for transmitting data in a communication system operating in HF comprising a link layer and a physical layer, said system comprising a transmitter and a receiver, said transmitter comprising at least one scheduler, the method is characterized in that it comprises:
a step of segmenting at least one first data stream $F_1$, and one second data stream $F_2$, each of the streams having a service constraint, each being segmented into a plurality of data sub-blocks $F_jBi$,
a step in which the data sub-blocks are transformed into a first frame $TF_1$ and a second frame $TF_2$, then a step of coding and interleaving of the first frame $TF_1$, and of the second frame $TF_2$ producing sub-frames $STF_{1c}$, $STF_{2c}$, by executing the following steps:
  segmenting the first stream $F_1$ into a plurality of blocks $F_1Bi$,
  preparing a first frame $TF_1$ by adding information required for the format used for the transmission,
  performing a coding and an interleaving of the data frame, $TF_{1c}$, the parameters of which are adapted to the formatting of the frame, producing sub-frames $STF_{1c}$,
  segmenting the second data stream $F_2$ into a plurality of blocks $F_1Bi$,
  preparing a first frame $TF_2$ by adding information required for the format used for the transmission,
  performing a coding and an interleaving of the data frame, $TF_{2c}$, the parameters of which are adapted to the formatting of the frame, producing sub-frames $STF_{2c}$,
  then a step of generation of a frame to be transmitted by executing the following steps:
  preparing the data of the physical frame PHY to be transmitted, according to instructions set by a scheduler by mixing the sub-frames $STF_{1c}$ of the data stream $F_1$ with m sub-frames $STF_{2c}$ of the data stream $F_2$ producing a frame $F_3$ comprising sub-frames $STF_{1c}$ and sub-frames $STF_{2c}$
  transmitting the duly prepared coded $T_3$ and interleaved $T_{3ce}$ frames, by alternating the frame transmission, TX/RX half-duplex switchover, the frame reception.

The step of coding and interleaving of the data frames is, for example, performed at the level of the physical layer of the transmission system.

The method can comprise an error correcting coding step, generating coded sub-frames $F_3C$ prior to the interleaving step.

The data streams are, for example, made up of non-time-constrained data stream $G_1$ and time-constrained data stream $G_2$ and the method comprises at least the following steps:
  segmenting the data streams having compatible non-time-constrained characteristics $G_1$ into a plurality of blocks $G_{1A}Bi$, $G_{1B}Bi$, $G_{1C}Bi$,
  preparing one or more data frames $TG_1$, $T'G_1$,
  coding and interleaving the data frame $TG_1$, and coding and interleaving the data frame $T'G_1$ separately,
  segmenting each of the coded and interleaved data frames $TG_{1c}$, $T'G_{1c}$,
  segmenting the data streams having compatible time-constrained characteristics $G_2$ into a plurality of blocks $G_{2A}Bi$, $G_{2B}Bi$,
  preparing one or more data frames $TG_2$, $T'G_2$,
  coding and interleaving the data frame $TG_2$, and coding and interleaving the data frame $T'G_2$ separately,
  segmenting each of the coded and interleaved data frames $TG_{2c}$, $T'G_{2c}$,
  preparing a plurality of frames $T_3G$ by mixing the sub-frames obtained from the stream $G_1$ and from the stream $G_2$, namely the sub-frames $STG_{1Ac}$, $STG_{1Bc}$, $STG_{1cc}$ $STG_{2Ac}$, $STG_{2B}$,
  interleaving each frame $T_3G$,
  transmitting the frames $T_3G$.

The step of transmission of the frames $T_3G$ can be executed by transmitting a first frame, followed by an RX/TX half-duplex switchover, followed by a reception time slot, followed by the transmission of a second frame $T_3G$.

The method can comprise an error correcting coding step prior to the step of interleaving of the frames $T_3G$.

The step of transmission of the frames $T_3G$ comprises, for example, a frame transmission step, followed by a guard time, followed by a transmission of a second frame, followed by a guard time.

The method can comprise a step of monitoring or listening to the data received during a time corresponding to the half-duplex switchover method and the inclusion of the time-constrained data of the time-constrained service $G_2$, for example speech, by processing them with the non-constrained stream data.

The method according to the invention is, for example, implemented in a data communication system and it is characterized in that the first stream is a non-constrained stream $H_1$, $H_2$ and the second stream is a constrained stream and in that only the non-constrained stream is coded and interleaved at the level of the physical link layer of a data transmission system.

The invention also relates to a system for transmitting a plurality of multiservice streams in the HF band comprising at least the following elements:
a transmitter comprising at least one scheduler suitable for executing the steps of the method that has one of the abovementioned features, for preparing the data frames of the multiservice streams prior to transmission over an HF channel, and a receiver.

BRIEF DESCRIPTION OF THE DRAWINGS

Other features and advantages of the device according to the invention will become more apparent on reading the following description of an exemplary embodiment given as a nonlimiting illustration, with figures attached which represent.

DETAILED DESCRIPTION

In order to better understand the features of the system according to the invention, the following description is given in the case of a half-duplex system for multiservice transmission in the HF band. Without departing from the framework of the invention, the systems and the methods which will be described apply also to full-duplex communications, or even communications using the TDMA protocol.

Figure 1:
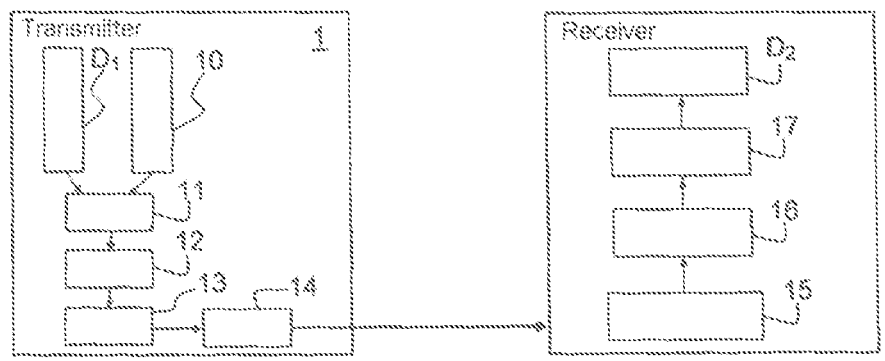
FIG. 1, a review of the data processing in a radio communication system.
Figure 2:
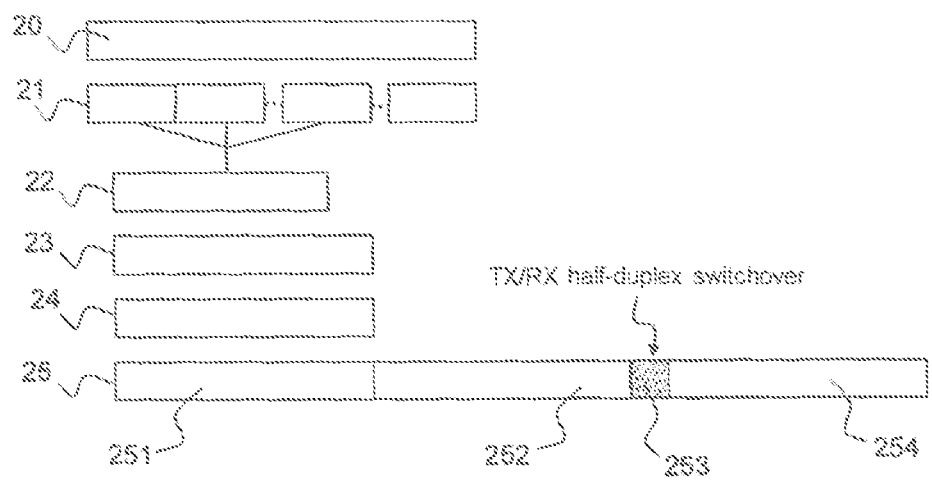
FIG. 2, the data processing steps according to the prior art.
Figure 3:
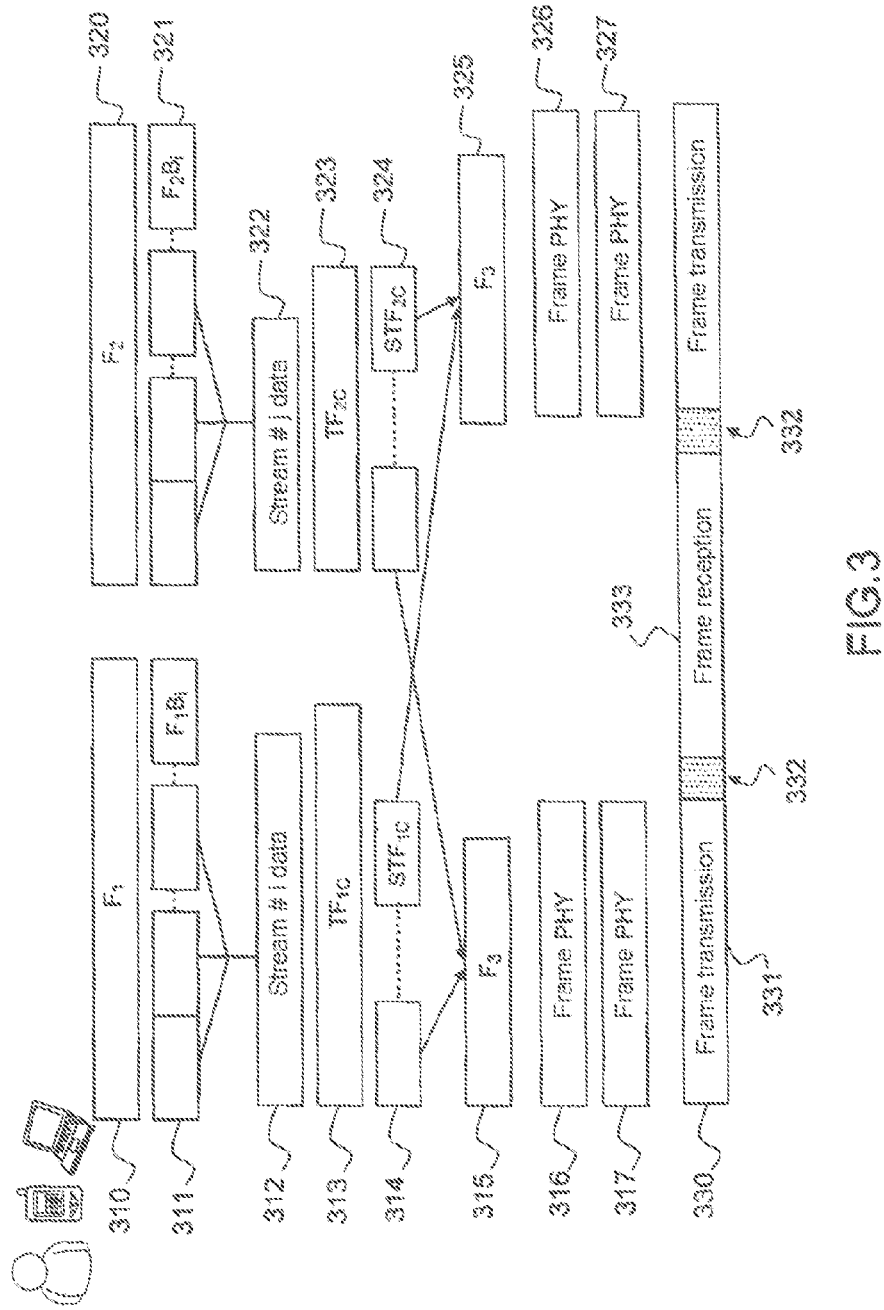
FIG. 3, a diagram representing the system and the method according to the invention, FIG. 4, a variant of FIG. 1 in the case of time-constrained stream and non-time-constrained stream, FIG. 5, a variant of FIG. 1 with an optimization of the correcting coding at the radio layer level, FIG. 6, a variant of the invention for a plurality of streams in the case of a "full duplex" communication, FIG. 7, a variant in the case of TDMA sharing, and FIG. 8, a diagram describing the steps of the method implemented.

FIG. 3 schematically represents the chronology of the different steps implemented by the invention for the case of two data streams to be transmitted.

At the link layer level, the first stream $F_1$ or packets of data 310 is segmented 311 into a plurality of blocks $F_1Bi$ (unitary cell for the ARQ retransmission process) according to a method known from the prior art. Then, the method prepares, 312, a first frame $TF_1$ by adding headers for example, by placing the frame in the format required for the transmission. The method will then, 313, perform a coding and an interleaving of the data frame, $TF_{1c}$, the parameters of which are adapted to the formatting of the frame. These operations are performed according to the service quality requirements of the service concerned. One of the advantages offered by this interleaving phase is to distribute the data over a plurality of frames, and do so transparently for the physical layer. It further makes it possible, in an extreme case, to interleave over a plurality of frames a single data stream and thus increase the size of the interleaver above an unchanged physical layer, and do so while keeping the capacity to have a return to half-duplex that is faster than the size of such an interleaver.

In the case of existing physical layers that do not make it possible to offer a solution without correcting coding by default, the correcting coding and interleaving step introduced at the link layer level will therefore have to take into account the presence of this coding. The result of this interleaving is, 314, the generation of sub-frames $STF_{1c}$.

The second data stream $F_2$ is processed identically in the succession of steps 321 (segmentation $F_2Bi$), 322 (addition of the headers), 323 (interleaving coding $TF_{2c}$), to obtain, 324, the sub-frames $STF_{2c}$.

At the level of the physical layer PHY of the communication system, in the steps 315 and 325, the method will prepare the data of the physical frame PHY to be transmitted, according to instructions set by a scheduler. The latter, based on the characteristics of the streams, on the required quality of service QoS, on the latency, etc., will prepare the data frames by mixing sub-frames $STF_{1c}$ of the data stream $F_1$ with sub-frames $STF_{2c}$ of the data stream $F_2$. This makes it possible to obtain a frame $F_3$ comprising sub-frames $STF_{1c}$ and sub-frames $STF_{2c}$. In practice, these sub-frames $STF_{1c}$, $STF_2$, . . . will be concatenated with the addition of a header making it possible to re-separate them at the receiver end. It is the step of interleaving of the frame F which will perform the mixing of the different sub-frames prior to the transmission of the channel (conventional interleaving step making it possible to offer, in combination with the correcting coding, a relative protection against fading phenomena).

The method continues by introducing an error correcting coding 316, 326, a step which is optional and which supplies coded sub-frames $F_{3c}$. Then, the method will perform a step of interleaving 317, 327 of the frames $F_{3c}$ at the level of the frame PHY.

The next step consists in transmitting 330 the duly prepared coded $T_{3c}$ and interleaved $T_{3ce}$ frames, by alternating the frame transmission 331, the TX/RX half-duplex switchover 332, the reception of frames 333.

Figure 4:
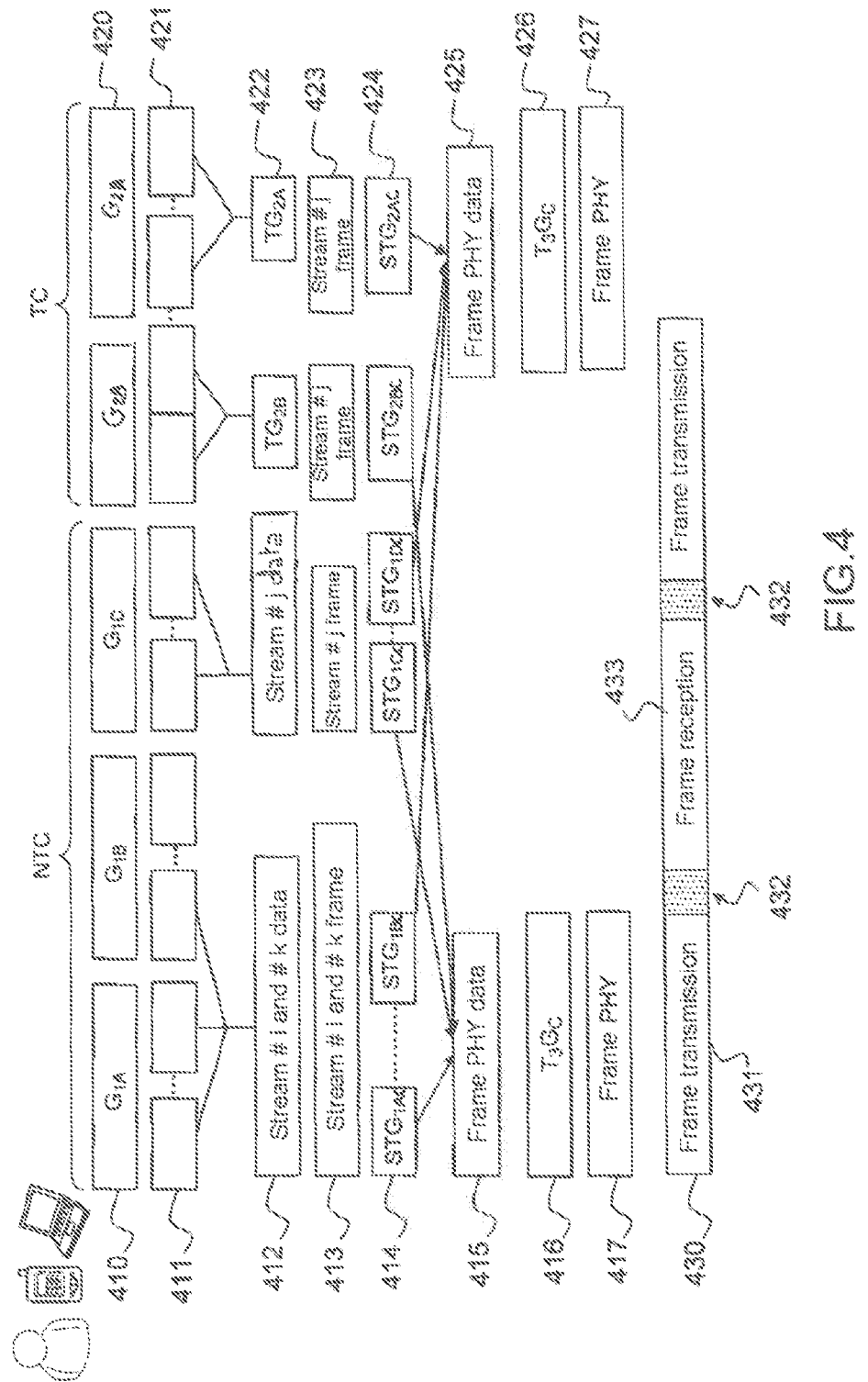

FIG. 4 is a variant implementation of the method described in FIG. 3 which relates to a plurality of non-time-constrained data streams to be transmitted NTC, $G_1$, and two time-constrained data streams TC, $G_2$.

In this exemplary embodiment, the key point for the processing of the streams is the time-constrained or "non-time-constrained" nature, that is to say the level of constraint on the latency and jitter associated with each service associated with each of the data streams.

The scheduler, in the step of preparation of the physical frame PHY, will distribute the sub-frames according to their time-constrained or non-time-constrained qualification. In practice, it is the application with time constraint which will bring the maximum constraint in terms of time between two half-duplex switchovers. The desired quality of service in terms of latency for this service TC will make it necessary to seek a transmit/receive cycle time smaller than its constraint, and therefore to cut up frames TF with a size compatible with a transmittal in a single transmission over the physical layer. This is illustrated in FIG. 4 by the fact that the frames 423 of the time-constrained queue are not cut up again into a plurality of sub-frames 424 but sent as such to the step 425 concatenating them with the data in the non-time-constrained queues. In the case where a plurality of TC queues are present, but with different time constraints, it is possible to choose to keep the strongest constraint, or allow, for the less time-constrained TC queues, a level of interleaving at the link level as in the NTC queues. In practice, the NTC queues have an interleaver applied to them that is at least as large as the largest interleaver possible for the physical layer standard considered, and, as explained previously, it is possible, if necessary, to consider interleaving over even greater widths. In practice, the benefit of the method according to the invention is to manage the streams by introducing as many TC queues as there are notably different quality of service levels (known by the acronym SLA, for Service Level Agreement).

FIG. 4 represents three non-time-constrained streams TNC, the streams $G_{1A}$, $G_{1B}$, $G_{1C}$ or data packets 410. Each of these streams is segmented 411 into a plurality of blocks $G_{1A}Bi$, $G_{1B}Bi$, $G_{1C}Bi$ (unitary cell for the ARQ retransmission process) according to a method known from the prior art. If it is considered that the two streams $G_{1A}Bi$, $G_{1B}Bi$ have compatible non-time constraints, then the method prepares, 412, a first data frame $TG_1$ by adding for example headers, and by placing the data in the format required for the transmission. The method will also make a second data frame $T'G_1$ from the stream $G_{1C}Bi$. The method performs, 413, a coding and an interleaving for each data frame $TG_{1c}$, $T'G_{1c}$, the parameters of which are adapted to the formatting of the frame. These operations are performed according to the quality of service requirements of the service concerned for a given application and for a data stream. One of the advantages offered by this interleaving phase is to distribute the data over a plurality of frames $TG_{1c}$, and do so transparently for the physical layer. It further makes it possible, in an extreme case, to interleave, over a plurality of frames $TG_1$, a single data stream, and thus increase the size of the interleaver above an unchanged physical layer, and do so by keeping the capacity to have a return to half duplex that is faster than the size of such an interleaver.

In the case of existing physical layers that do not make it possible to offer a solution without correcting coding by default, the correcting coding and interleaving step introduced at the link layer will therefore have to take into account the presence of this coding. The result of this interleaving is the generation 414 of a first type of sub-frames $STG_{1c}$.

The second data stream $G_2$ is processed identically. FIG. 4 shows two types of time-constrained streams $G_{2A}$, $G_{2B}$ which are segmented 421, into blocks $G_{2A}Bi$, $G_{2B}Bi$. From the sub-blocks $G_{2A}Bi$, $G_{2B}Bi$, the method prepares two frames, 422, $TG_{2A}$, $TG_{2B}$ (addition of the headers). For each of the frames, the method executes a coding and interleaving step 423 (coding-interleaving $TG_{2Ac}$, $TG_{2Bc}$) according to the constraints of the stream. Next, each frame $TG_{2Ac}$, $TG_{2Bc}$ is segmented to obtain, 424, sub-frames $STG_{2Ac}$, $STG_{2Bc}$.

During the steps 415 and 425, the method will prepare, from the sub-frames resulting from the segmentation steps, the data of the frame PHY to be transmitted according to instructions given by a scheduler. The latter, based on the characteristics of the streams, on the quality of service, on the latency, for example, will prepare frames $T_3G$ by mixing the sub-frames obtained from the stream G1 and from the stream G2, namely the sub-frames $STG_{1Ac}$, $STG_{1Bc}$, $STG_{1cc}$ $STG_{2Ac}$, $STG_{2Bc}$ in FIG. 4.

The method continues by introducing an error correcting coding 416, 426, a step which is optional and which supplies coded frames $T_3G_c$. Then, the method will perform a step of interleaving, 417, 427, of the coded frames $T_3G$ at the frame PHY level.

The next step consists in transmitting the duly prepared frames, by alternating the frame transmission 430, the TX/RX half-duplex switchover 431, the frame reception 432.

The data of a frame can be distributed between half-duplex switchovers.

Figure 5:
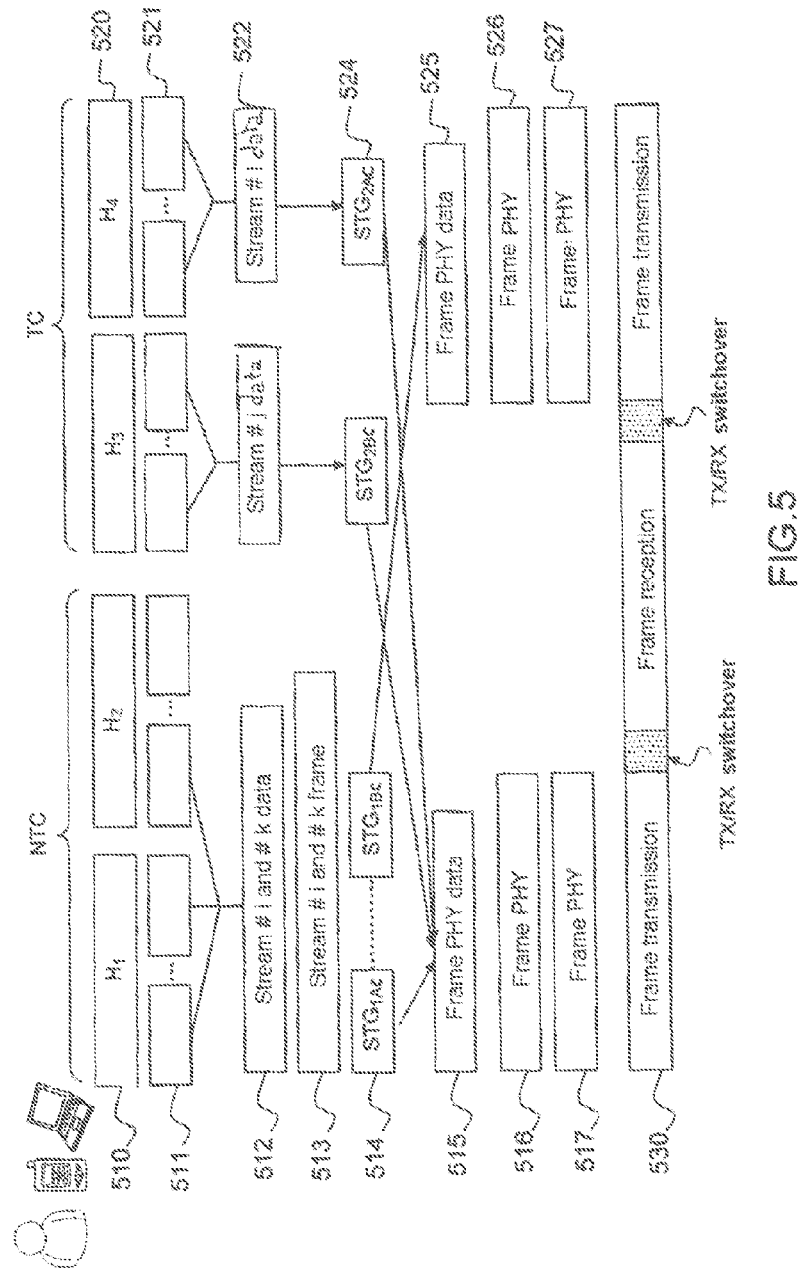

FIG. 5 represents a variant embodiment of the invention in the case of two NTC streams $H_1$, $H_2$ and two TC streams $H_3$, $H_4$.

The two non-time-constrained streams $H_1$, $H_2$, after segmentation 511, are processed, for example, to add headers, by setting them to the format required for the transmission 512. The method will then, 513, perform a coding and an interleaving of the frame, the parameters of which are adapted to the formatting of the frame. These operations are performed according to the quality of service requirements of the service concerned. The interleaved data are then segmented 514 to generate a plurality of sub-frames. In the step 515, the method will prepare the PHY frame to be transmitted according to instructions given by a scheduler. The data frame is coded 514 by using an error correcting code known to those skilled in the art. Then, the coded data are then interleaved 517.

For the two time-constrained streams $H_3$, $H_4$, as in the example of FIG. 4 where a single time-constrained stream $G_2$ was considered, there is no interleaving performed at the link level. It is also possible to rely on the physical layer to perform the correcting coding operation 526. Such an optimization operation notably makes it possible to save on processing time in the radio access layers, which is advantageous for streams with real-time constraint, notably if it is possible to introduce a suitable correcting coding at the physical layer level, for example of unequal error protection type.

The data frames resulting from the two processing chains, non-time constrained and time-constrained, are then distributed for transmission, by observing, for example, the transmission of a frame, TX/RX half-duplex switchover, reception of a frame, half-duplex switchover, reception.

In the case of a watched application for speech, the method will enable a receiver to monitor or regularly listen to the data received upon the half-duplex switchover by a method known to those skilled in the art and to toggle from a first state in which the system receives only non-time-constrained data streams, to a second state taking into account the time-constrained data streams by a principle described for example in FIG. 4 or FIG. 5. The method according to the invention thus naturally offers the advantage of being able to toggle to a speech communication, for example detected by watching a speech channel in the reception phases, in parallel with a data transmission without interrupting the latter.

Figure 6:
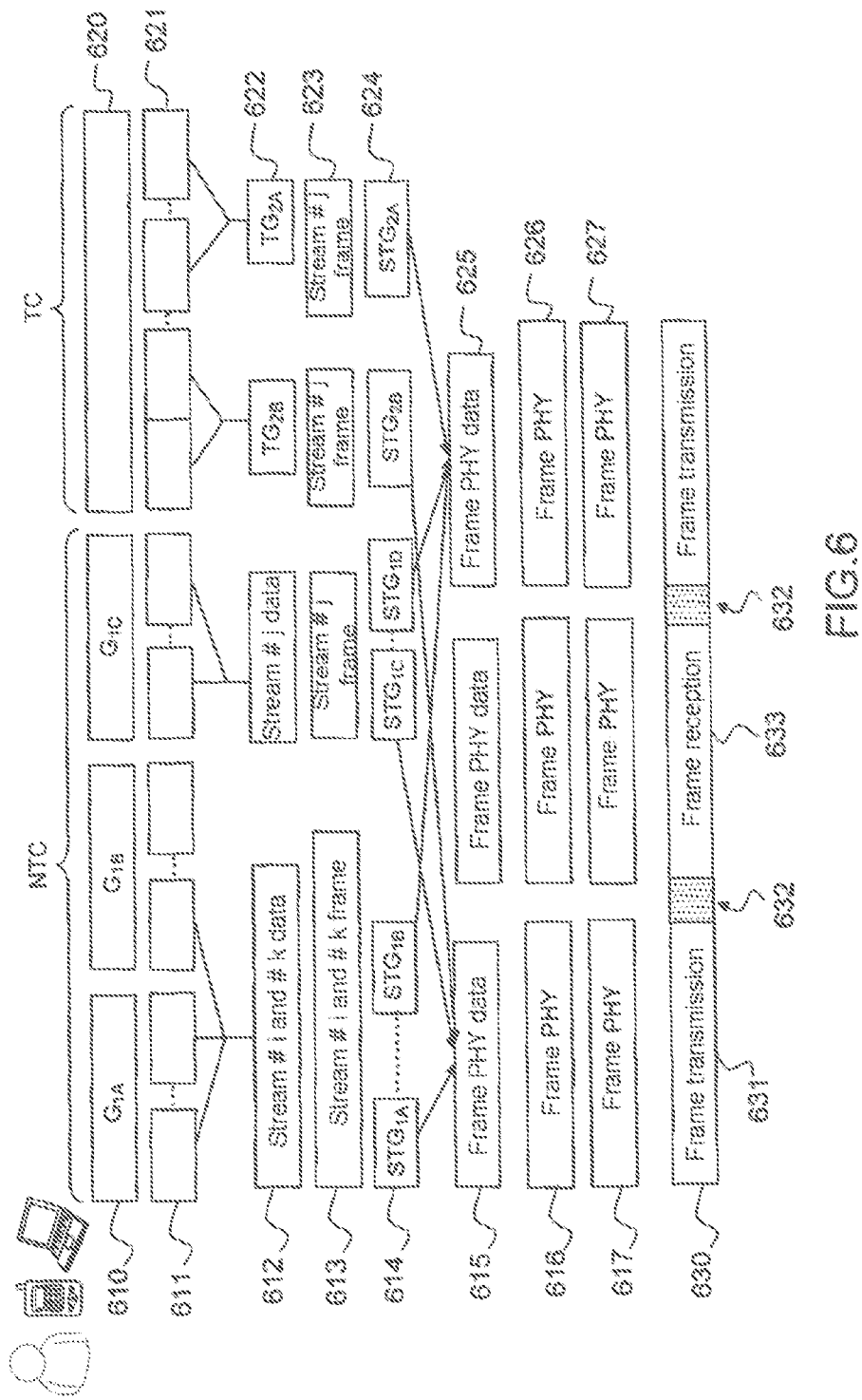

FIG. 6 schematically represents an exemplary implementation of the system and of the method according to the invention in the case of a link in which the data circulate bidirectionally and simultaneously, better known by the term "full-duplex". The steps of processing of the constrained and non-constrained constrained streams are similar to those described in FIG. 4.

The data are transmitted according to the following sequence; transmission of data of a frame, guard time, transmission of data of a frame, etc.

At the receiver part, the reception of the streams is performed, for example, as follows: reception—half-duplex switchover—reception—half-duplex switchover, etc., and this is done synchronously.

Figure 7:
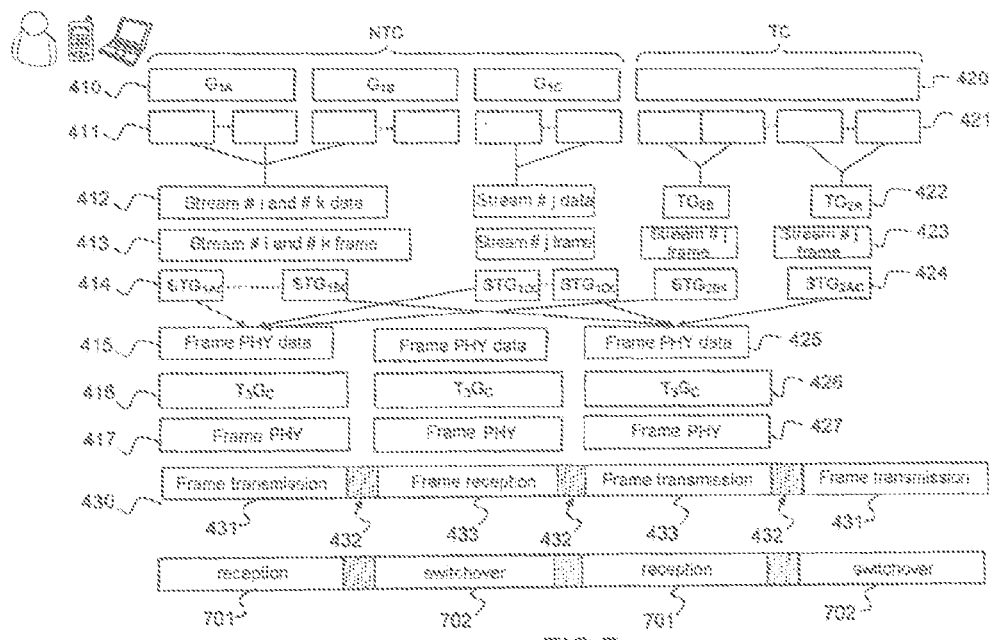

FIG. 7 schematically represents an implementation in the case of a communication using the time-division multiple access protocol, better known by the acronym "TDMA". In this case, the data processing steps are similar to the steps described in FIG. 4. For the step of transmission of a frame, the sequence is, for example, as follows: transmission of a frame, guard, frame reception, guard, frame reception. The data of a frame can be divided up into a plurality of frames by virtue of the use of the TDMA.

At the receiver part, the reception of the streams is performed, for example, as follows: reception 701—half-duplex switchover 702—reception 701—half-duplex switchover, etc. and this is done synchronously.

Figure 8:
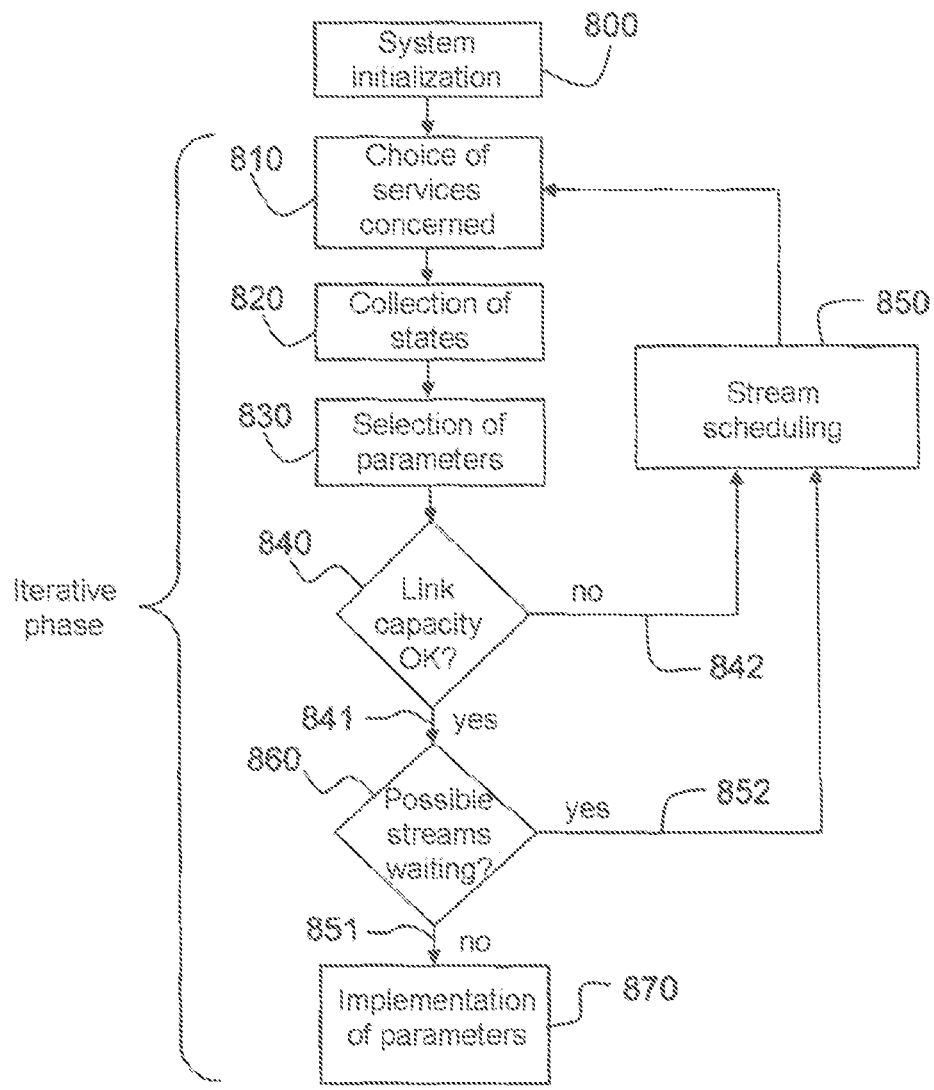

FIG. 8 presents an algorithm allowing for convergence on the choice of parameters for the different services to be served. The steps of this algorithm are as follows:

800, 810—a system initialization step in which the system collects information (services to be provided, associated bit rates and SLAs),

820—a step of determination, for each of the possible services for the system considered, of its operating points: target latency, bit rate, error rate,

830—the setting up of all the PHY layers available for the system considered,

840—the adaptation to the transmission link (recurrent step)

the updating of queue state information the determination of the capacity offered by the radio link (e.g. noise level, etc.), in the case where the capacity of the link does not make it possible to process all the streams, 842, there is a return to a scheduling step 850 which manages the streams according to their priority, in the case where the capacity of the link allows it 841, then the method will go on to the next step of checking the data streams, the monitoring of the states of the different queues of the services considered, including the ARQ queues for the NTC messages, the selection of the parameters for the communication comprising:

the recurrence of the half-duplex switchover set by the most constraining service in terms of latency/jitter, the level of coding and interleaving for the streams defined as a function of their target operating point and of their latency/jitter constraint.

By default, a solution with two classes is offered: a time-constrained queue TC, and an NTC queue maximizing the BER performance levels.

850—the scheduling loop is a control loop managing the streams according to their priority makes it possible to accept only the most important streams when the link capacities are less than the total volume to be transmitted.

870—a step of implementation of the parameters retained for the data transmission.

The method according to the invention relies on a decorrelation of the size of the data frame of the half-duplex switchover and makes it possible to change to an approach of multiplexing of the data in the physical frame transmitted, with a management of the ARQ processes of the services above a physical layer PHY that is standard or optimized in terms of correct encoding. It makes it possible to have a plurality of logic channels with different requirements operate on one and the same HF link operated in half-duplex mode and therefore to multiplex services as diverse as speech and file transfer. The invention makes it possible to guarantee the upholding of the quality of service requirements in terms of latency/jitter. It also allows data streams with little or no time constraint in terms of latency/jitter to benefit from the enhanced performance levels by the use of a large interleaver. By implementing the system and the method according to the invention, it is possible to use the same HF link for applications with highly variable quality of service requirements, and to do so by adapting the interleaving and protection levels as fairly as possible to each stream. Finally, the invention makes it possible to profit from the use of a large interleaver while having a faster return in terms of signaling.

The efficiency of the system and of the method according to the intervention is based on a fast interleaving between the short transmit and receive frames. The switching between transmission and reception is short compared to the length of the frames. This approach is compatible with different point-to-point, TDMA transmission modes. The method is also compatible with existing physical layers (standardized and/or installed in existing products), but could also be applied advantageously to optimized physical layers, for example by considering the possibility of using unequal protection correcting codes.

The invention claimed is:

1. A method for transmitting data in a communication system operating in a high-frequency (HF) band having a link layer and a physical layer, said communication system including a transmitter and a receiver, said transmitter including at least one scheduler, the method comprising:

a step of segmenting at least one first data stream $F_1$, and one second data stream $F_2$, each of the at least one first and second data streams $F_1$ and $F_2$ having a service constraint, each of the data streams $F_1$ and $F_2$ being segmented into a plurality of data sub-blocks $F_jBi$, a step of transforming the data sub-blocks $F_jBi$ are transformed into a first frame $TF_1$ and a second frame $TF_2$, a step of coding and interleaving the first frame $TF_1$, and of the second frame $TF_2$, producing sub-frames $STF_{1c}$, $STF_{2c}$, by executing the following steps:

segmenting the first data stream $F_1$ into a plurality of blocks $F_1Bi$, preparing the first frame $TF_1$ by adding information required for a format used for a transmission by the transmitter, performing a coding and an interleaving of the first frame $TF_1$, parameters of which are adapted to the format of the first frame $TF_1$, for producing sub-frames $STF_{1c}$, segmenting the second data stream $F_2$ into a plurality of blocks $F_1Bi$, preparing the second frame $TF_2$ by adding information required for the format used for the transmission, and performing a coding and an interleaving of the second frame $TF_2$, parameters of which are adapted to the format of the second frame, producing sub-frames $STF_{2c}$, and a step of generating a transmission frame to be transmitted by the transmitter by executing the following steps:

preparing data of a physical layer frame to be transmitted, according to instructions set by a scheduler by mixing the sub-frames $STF_{1c}$ of the first data stream $F_1$ with m number of the sub-frames $STF_{2c}$ of the second data stream $F_2$ producing a frame $F_3$ having the sub-frames $STF_{1c}$ and the m number of the sub-frames $STF_{2c}$, m being an integer greater than or equal to one, and transmitting the prepared physical layer frame including coded and interleaved frames, by alternating said transmitting with a half-duplex switchover to a receiving of a reception frame by the receiver of the communication system, wherein the at least one first data stream $F_1$ and the at least one second data stream $F_2$ are made up of a non-time-constrained data stream $G_1$ and a time-constrained data stream $G_2$, the method further comprising:

segmenting the at least one first data stream $F_1$ and the at least one second data stream $F_2$ having compatible non-time-constrained characteristics of the non-time-constrained data stream $G_1$ into a plurality of blocks $G_{1A}Bi$, $G_{1B}Bi$, $G_{1C}Bi$, preparing one or more data frames $TG_1$, $T'G_1$, coding and interleaving the data frame $TG_1$, and coding and interleaving the data frame $T'G_1$ separately, segmenting each of the coded and interleaved data frames $TG_{1c}$, $T'G_{1c}$ from the data frame $TG_1$ and the data frame $T'G_1$, respectively, segmenting data streams including the at least one first data stream $F_1$ and the at least one second data stream $F_2$ having compatible time-constrained characteristics $G_2$ into a plurality of blocks $G_{2A}Bi$, $G_{2B}Bi$, preparing another set of one or more data frames $TG_2$, $T'G_2$, coding and interleaving the data frame $TG_2$, and coding and interleaving the data frame $T'G_2$ separately, segmenting each of the coded and interleaved data frames $TG_{2c}$, $T'G_{2c}$ resulting from the data frame $TG_2$ and the data frame $T'G_2$, respectively, preparing a plurality of frames $T_3G$ by mixing the sub-frames obtained from the non-time-constrained data stream $G_1$ and from the time-constrained data stream $G_2$, namely the sub-frames $STG_{1Ac}$, $STG_{1Bc}$, $STG_{1Cc}$, $STG_{2Ac}$, $STG_{2B}$, interleaving each of the plurality of frames $T_3G$, transmitting the interleaved frames T3G.

2. The method as claimed in claim 1, wherein the step of coding and interleaving of the first frame $TF_1$ and the second frame $TF_2$ is performed at a level of a physical layer (PHY) of the transmitter.

3. The method as claimed in claim 1, further comprising an error correcting coding step, generating coded sub-frames $F_3c$ prior to the interleaving step of each of the first frame $TF_1$ and the second frame $TF_2$.

4. The method as claimed in claim 1, wherein the step of transmission of the interleaved frames $T_3G$ is executed by transmitting a first frame, followed by an RX/TX half-duplex switchover, followed by a reception time slot, followed, by the transmission of a second frame in the interleaved frames $T_3G$.

5. The method as claimed in claim 4, comprising an error correcting coding step prior to the step of interleaving of each of the frames $T_3G$.

6. The method as claimed in claim 1, further comprising an error correcting coding step prior to the step of interleaving of the frames $T_3G$.

7. The method as claimed in claim 1, wherein the step of transmission of the frames $T_3G$ comprises a frame transmission step, followed by a guard time, followed by a transmission of a second frame, followed by a guard time.

8. The method as claimed in claim 1, further comprising a step of monitoring or listening to data received during a time corresponding to the half-duplex switchover and taking into account time-constrained data of the time-constrained data stream $G_2$ including speech data packets by processing said speech data packets with data in the non-time-constrained data stream $G_1$.

9. The method as claimed in claim 1, wherein the communication system is implemented in a data communication system, wherein the first data stream $F_1$ is a non-constrained stream ($H_1$, $H_2$) and the second data stream $F_2$ is a constrained stream ($H_3$, $H_4$) such that only the non-constrained stream is coded and interleaved at the level of the physical link layer of a data transmission system.

10. A system for transmitting a plurality of multiservice streams in the HF band comprising at least the following elements: a transmitter comprising at least one scheduler adapted for executing the steps of the method as claimed in claim 1, for preparing data frames of multiservice streams prior to transmission over an HF channel to a receiver.

\* \* \* \* \*